US007697472B2

(12) United States Patent
Sadovsky et al.

(10) Patent No.: US 7,697,472 B2
(45) Date of Patent: Apr. 13, 2010

(54) REPORTING PORTABLE DEVICE STATISTICS

(76) Inventors: Vladimir Sadovsky, c/o Microsoft Corporation, One Microsoft Way, Redmond, WA (US) 98052; Michael D. Stokes, c/o Microsoft Corporation, One Microsoft Way, Redmond, ID (US) 98052; Oren Rosenbloom, c/o Microsoft Corporation, One Microsoft Way, Redmond, WA (US) 98052

( * ) Notice: Subject to any disclaimer, the term of this patent is extended or adjusted under 35 U.S.C. 154(b) by 860 days.

(21) Appl. No.: 11/451,890

(22) Filed: Jun. 13, 2006

(65) Prior Publication Data

US 2007/0288628 A1    Dec. 13, 2007

(51) Int. Cl.
*H04Q 7/00* (2006.01)
*H04Q 7/24* (2006.01)
*H04M 1/66* (2006.01)

(52) U.S. Cl. .................. 370/328; 370/338; 455/410
(58) Field of Classification Search ............ 455/445, 455/515, 419, 410, 406; 709/224; 707/200; 714/45; 370/328, 338
See application file for complete search history.

(56) References Cited

U.S. PATENT DOCUMENTS

| | | | |
|---|---|---|---|
| 5,577,100 A * | 11/1996 | McGregor et al. | .......... 455/406 |
| 6,008,737 A | 12/1999 | Deluca et al. | |
| 6,795,700 B2 | 9/2004 | Karaoguz et al. | |
| 7,013,112 B2 | 3/2006 | Haller et al. | |
| 7,493,525 B2 * | 2/2009 | Wigley et al. | .................. 714/45 |
| 2004/0044694 A1 * | 3/2004 | Henig et al. | ................ 707/200 |
| 2005/0148335 A1 * | 7/2005 | Benco et al. | ................ 455/445 |
| 2005/0193106 A1 | 9/2005 | Desai et al. | |
| 2005/0272983 A1 | 12/2005 | Maytal | |
| 2006/0019723 A1 | 1/2006 | Vorenkamp et al. | |
| 2006/0026168 A1 | 2/2006 | Bosworth et al. | |
| 2006/0223496 A1 * | 10/2006 | Benco et al. | ................ 455/410 |

FOREIGN PATENT DOCUMENTS

WO    WO 00/62087 A1    10/2000

OTHER PUBLICATIONS

F. Darnell, et al.; Testing the E-Business Infrastructure: Expanding Into the Wireless/Mobile Enviroments* (http://csdl2.computer.org/comp/proceedings/hicss/2002/1435/09/14350299b.pdf).
Daniel McKenna; Mobile Platform Benchmarks (a Methodology for Evaluating Mobile Computing Devices); Feb. 3, 2000; (http://www.charmed.com/PDF/BenchmarkWhitePaper_2-3-00.pdf).

* cited by examiner

*Primary Examiner*—Charles N Appiah
*Assistant Examiner*—Kiet Doan
(74) *Attorney, Agent, or Firm*—Shook, Hardy & Bacon LLP

(57) ABSTRACT

A system, a method and computer-readable media for collecting device usage information from portable devices. The portable devices are enabled to maintain device operation parameters. This information is communicated from a portable device to a host device. The host device may communicate the received information over a network to a database. The database may consolidate the device operation parameters from multiple portable devices.

10 Claims, 5 Drawing Sheets

REPORTING PORTABLE DEVICE STATISTICS

BACKGROUND

A growing number of portable devices are currently available to consumers. Examples of such portable devices include music players, digital cameras, video cameras, digital recorders and personal digital assistants (PDAs). To facilitate the connection between these devices and a host computer, the computer typically has an operating system configured to detect a particular portable device when it is connected to the computer. Once detected, the computer operating system can enable communication with the portable device.

Despite the best efforts of the providers of portable devices, such devices inevitably fail at one time or another. One type of failure is a crash. A crash occurs while a program module is running on the device and results in the suspension of operations on the device. Crashes are frustrating to users and, in some cases, may result in loss of information stored on a device. Though failures may greatly impact the usability of a device, providers of portable devices generally have limited means to discover the prevalence and causes of these failures.

In contrast, certain computer systems utilize a persistent network connection to report device usage and failure data. When an error occurs on such a networked-computer, the computer generates and submits an error report over the network. For example, a software provider may receive error reports and other computer usage information from many different computers. With this feedback, the software provider may improve their product and send updated software to their customers. By utilizing network connections, the software provider can receive information describing the operation of its products and can maintain a relationship with its end users.

Portable devices, however, generally do not maintain a persistent network connection or have the ability to connect to a network. Accordingly, it is difficult for providers of these devices to receive error data. Further, these providers have limited means to communicate product updates and other information to their customers. In short, providers of portable device are often unable to maintain a relationship with device users and are unable to receive important device usage and failure data from such end-users.

SUMMARY

The present invention provides systems and methods for collecting device usage information from portable devices. The portable devices are enabled to maintain device operation parameters. For example, the portable devices may maintain statistics describing the operation and failures of a device. This information is communicated from a portable device to a host device. The host device may communicate the received information over a network to a database. The database may consolidate the device operation parameters from multiple portable devices. The consolidated information, for example, may be used by a device maker to understand the usage of their product and to improve existing and future products.

It should be noted that this Summary is provided to generally introduce the reader to one or more select concepts described below in the Detailed Description in a simplified form. This Summary is not intended to identify key and/or required features of the claimed subject matter, nor is it intended to be used as an aid in determining the scope of the claimed subject matter.

BRIEF DESCRIPTION OF THE SEVERAL VIEWS OF THE DRAWING

The present invention is described in detail below with reference to the attached drawing figures, wherein.

DETAILED DESCRIPTION

The subject matter of the present invention is described with specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the term "step" may be used herein to connote different elements of methods employed, the term should not be interpreted as implying any particular order among or between various steps herein disclosed unless and except when the order of individual steps is explicitly described. Further, the present invention is described in detail below with reference to the attached drawing figures, which are incorporated in their entirety by reference herein.

Figure 1:
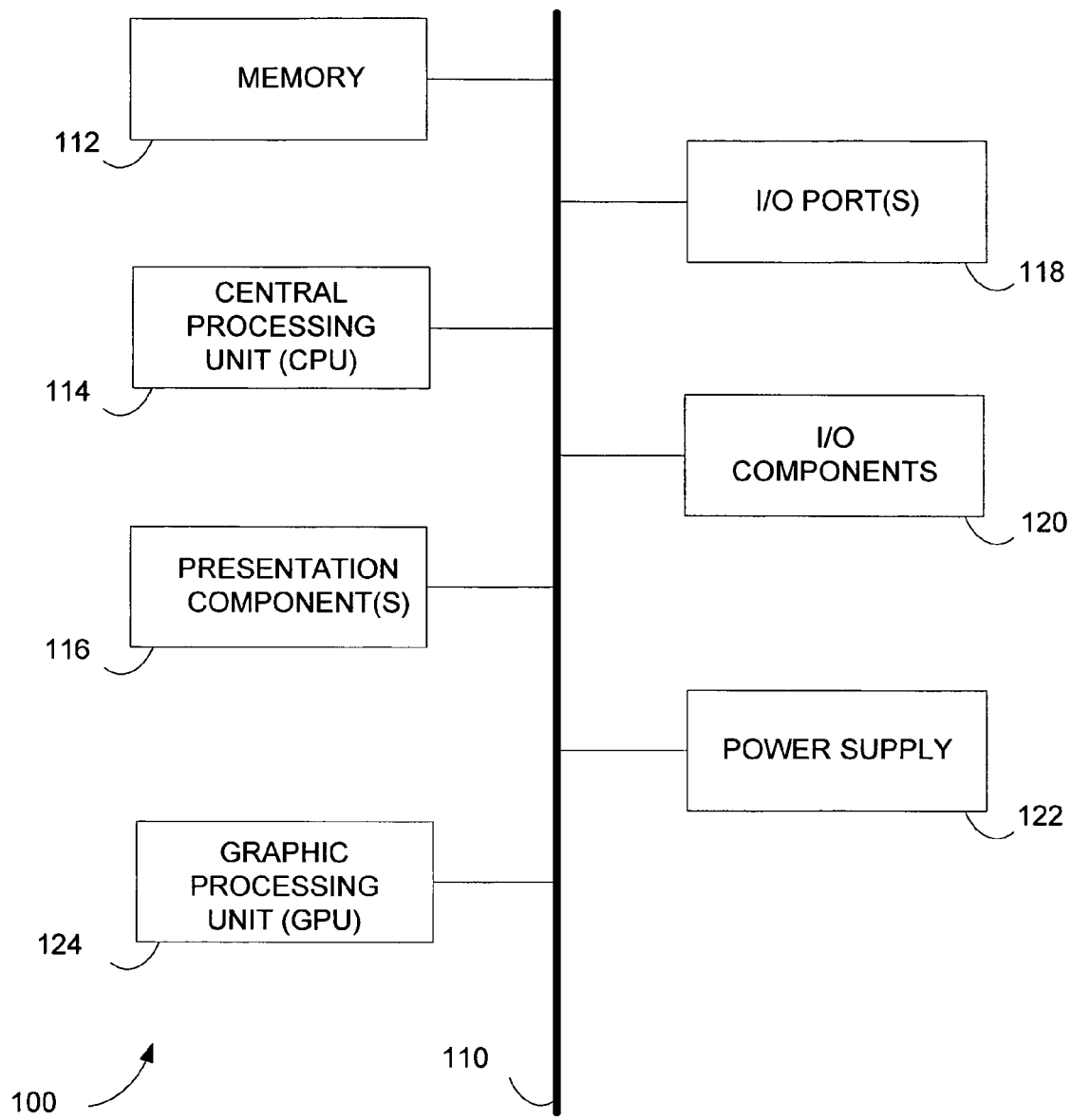
FIG. 1 is a block diagram of a network environment suitable for use in implementing the present invention.

Referring initially to FIG. 1 in particular, an exemplary operating environment for implementing the present invention is shown and designated generally as computing device 100. Computing device 100 is but one example of a suitable computing environment and is not intended to suggest any limitation as to the scope of use or functionality of the invention. Neither should the computing-environment 100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, specialty computing devices (e.g., cameras and printers), etc. The invention may also be practiced in distributed computing environments where tasks are performed by remote-processing devices that are linked through a communications network.

With reference to FIG. 1, computing device 100 includes a bus 110 that directly or indirectly couples the following elements: memory 112, a central processing unit (CPU) 114, one or more presentation components 116, input/output ports 118, input/output components 120, an illustrative power supply 122 and a graphics processing unit (GPU) 124. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be gray and fuzzy. For example, one may consider a presentation component such as a display device to be an I/O component. Also, CPUs and GPUs have memory. The diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices, carrier wave or any other medium that can be used to encode desired information and be accessed by computing device 100.

Memory 112 includes computer-storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc. I/O ports 118 allow computing device 100 to be logically coupled to other devices including I/O components 120, some of which may be built in. Illustrative components include a microphone, joystick, game pad, satellite dish, scanner, printer, wireless device, etc.

Figure 2:
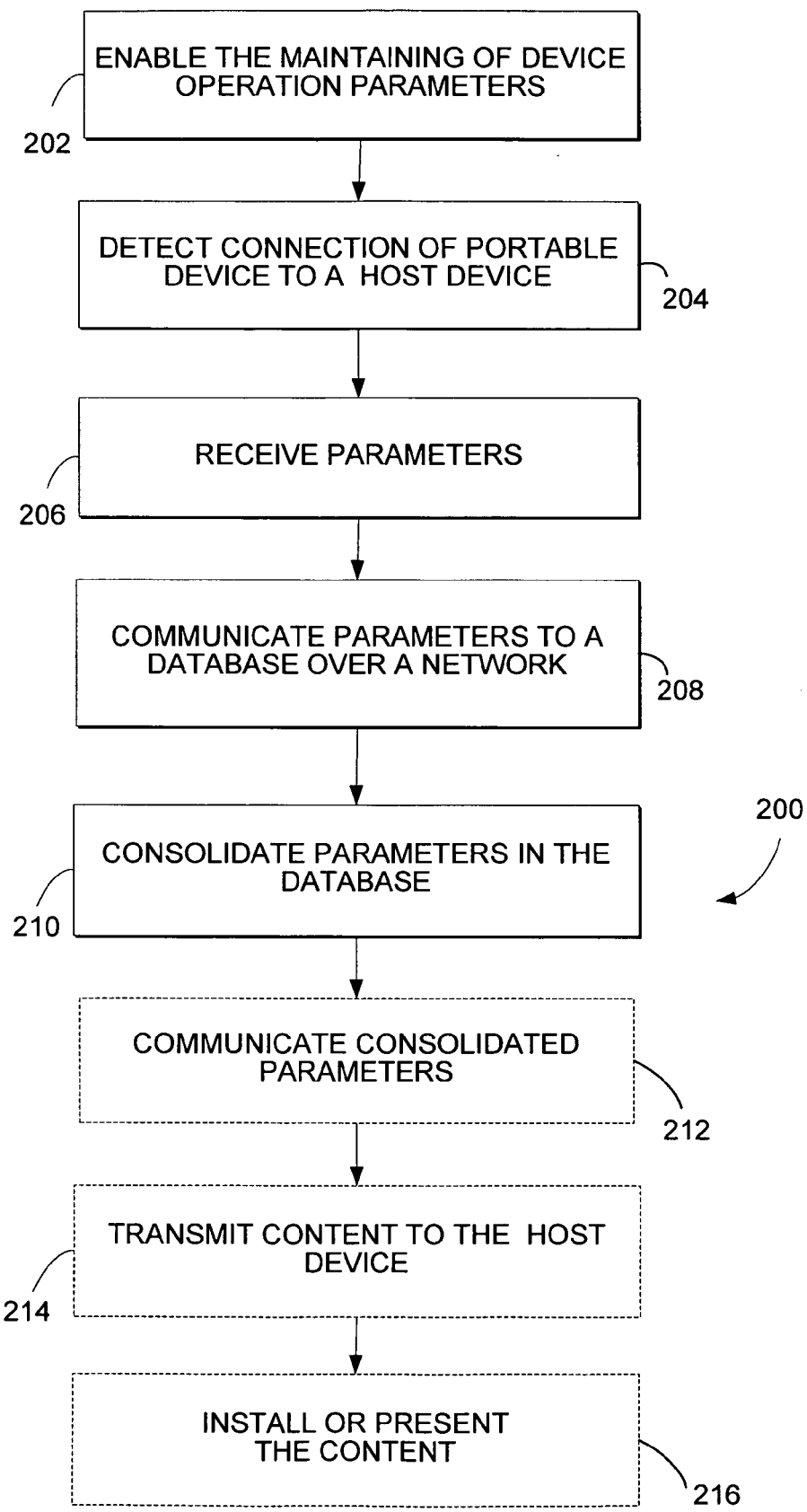
FIG. 2 illustrates a method in accordance with one embodiment of the present invention for collecting device usage information from a portable device.

FIG. 2 illustrates a method 200 for collecting device usage information from a portable device. The method 200, at 202, enables a portable device to maintain operation parameters. The portable device may be any of a variety of different devices. Examples of portable devices include digital recorders, digital cameras, camcorders, music players (e.g., playing CDs, DVDs, music stored in MP3 (MPEG Audio Layer 3) or WMA (Windows Media Audio) formats, etc.), wireless phones (e.g., multifunction media-enabled cellular phones) and so forth. The portable device may include internal memory upon which data may be stored and/or written. For example, the portable device may have a removable flash memory card. The portable device may also be configured to maintain information about the device's usage and failures. For example, the portable device may be configured to maintain a log and/or statistics related to the performance, errors and usage of the device. These device operations parameters may be stored on the device in, for example, the device's internal memory.

At 204, the method 200 detects connection of the portable device to a host device. The host device can be any of a variety of different devices. Examples of host devices include computers (e.g., desktop computers, server computers, laptop or notebook computers, handheld computers, automotive computers or PCs, etc.), set-top boxes (e.g., digital video recorders, gaming consoles, television tuners such as cable boxes or satellite boxes, etc.), printers, and so forth.

As used herein, the portable device "connecting" to the host device refers to the portable device being in communication with the host device and allowing commands and/or data to be transmitted between the devices. This communication may be over a wire medium (e.g., a cable) or a wireless medium (e.g., using radio frequency signals, ultrasonic signals, infrared signals, etc.). A variety of techniques exist in the art to detect connection of a portable device to a host device, and the method 200 may utilize any number of these techniques.

The method 200, at 206, receives device operations parameters (e.g., device usage and failure data) from the portable device. In one embodiment, the method 200 may utilize a protocol for communications between the portable device and the host device. A protocol refers to a collection of rules, procedures, and/or conventions relating to the format and/or timing of data transmissions between two devices, including commands that can be sent between devices and the formats for those commands. In certain implementations, the portable device supports two protocols, although three or more protocols may be supported. These two protocols are referred to herein as a base functionality protocol and an enhanced functionality protocol. As their names imply, the base functionality protocol supports just the basic functionality for the portable device, while the enhanced functionality protocol supports more robust functionality. An example of a base functionality protocol is the Universal Serial Bus (USB) Mass Storage Class—UFI Command Specification, Revision 1.0, available from the USB Implementers Forum. An example of an enhanced functionality protocol is the Media Transfer Protocol (MTP) Specification, available from Microsoft Corporation of Redmond, Wash. The enhanced functionality protocol may allow additional functionality of the portable device to be accessed beyond which can be accessed using the base functionality protocol. This additional functionality, for example, may include access to device operation parameters stored on the portable device's internal memory.

At 208, the method 200 communicates the device operation parameters to a database over a network. The network may, for example, be an intranet or the Internet. In one embodiment, upon the connection of the portable device to the host device, the portable device may upload an aggregated set of the device operation parameters through an MTP extension. Using these parameters, software on the host device may detect the presence of new information in the uploaded parameters. The host device may key this information with a device identification tag and then upload the information to the database over the Internet.

The method 200, at 210, consolidates the parameters communicated via the network into a database that houses information from numerous portable devices. A variety of techniques exist in the art for consolidating information from different entities into a database. In one embodiment, the database may be a centralized clearinghouse that compiles statistics related to a particular device. For example, the device may be a particular model of a digital camera. In this example, the maker of the digital camera may be interested in determining the prevalence of system failures on their devices. The cameras may log such failures, and this information may be communicated to the database for consolidation with log data from many different cameras. As will be appreciated by those skilled in the art, the portable devices may track any number of device characteristics and, by consolidating characteristics from many in-usage devices, an accurate picture of the device's operation and usage may be obtained.

Optionally, the method 200, at 212, communicates the consolidated parameters to the device maker or another entity interested in monitoring the performance/usage of the portable device. For example, by receiving failure data from many different cameras, the device maker may learn how often their camera fails and may discern potential causes. Also the information may indicate which features of the portable device are often used and which features are rarely utilized. This information may be useful in the improvement of existing products and the development of future products.

The device maker may desire to communicate information to the end users in response to the consolidated parameters. Accordingly, the method 200, at 214, optionally transmits content back to the host device. For example, if the consolidated information indicates a frequent error occurring on the portable device, the device maker may develop a firmware update for the software running on the portable device. Such updated firmware may be developed to reduce the occurrences of this frequent error. As another example, the device maker may supply users device tips and promotional content. The method 200, at 214, presents the content to the user and/or installs the content on the portable device. As will be appreciated by those skilled in the art, the method 200 not only provides the device maker feedback from their customers, but it also enables the device maker to maintain contact and a relationship with such customers.

Figure 3:
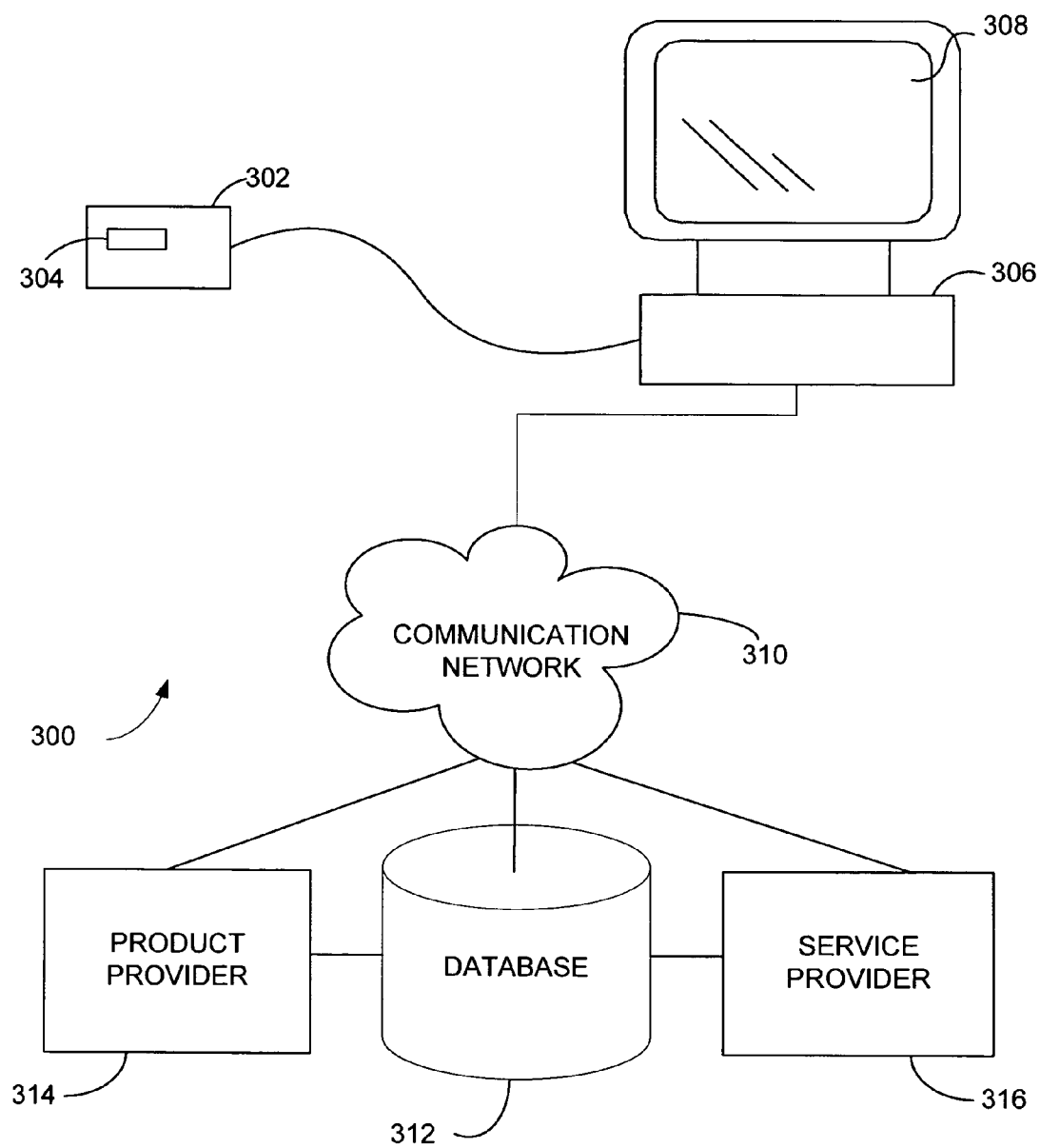
FIG. 3 is a schematic diagram illustrating a system for reporting device usage information for portable devices in accordance with one embodiment of the present invention.

FIG. 3 illustrates a system 300 for reporting device usage information from portable devices. The system 300 includes a portable device 302. The portable device 302 may be any of a variety of different devices and may include an internal memory element 304 for storing data. In one embodiment, the portable device 302 may be configured to maintain statistics or other information describing the usage, operation and failures of the device 302. For example, the portable device 302 may be enabled to monitor a set of metrics. These metrics may be static and defined by the device's manufacturer. Alternately, the set of metrics may be dynamically configurable. For example, from time-to-time the portable device 302 may receive an updated set of metrics defining different statistics to maintain. In either case, the complied information may be stored on the internal memory element 304 in a log file.

The system 300 further includes a host device 306 that is in communication with a network 310. The host device 306 may be any device configured to connect or communicate with the portable device 302. In one embodiment, the host device 306 may be a computer configured to maintain a physical or wired connection with the portable device 302. In another exemplary embodiment, the portable device 302 may be a mobile telephone, and the host device 306 may be data server configured to maintain a wireless connection with the portable device 302. The host device 306 may include a user interface 308. Using the interface 308, the host device 306 may present information to the user and may receive user inputs.

When the portable device 302 is connected to the host device 306, a variety of information may be exchanged between the two devices. For example, the portable device 302 may signal that it is capable of collecting various statistics. In one embodiment, the user may be given the option to disallow all collection of statistics or the option to enable partial or full participation in the monitoring program. Based on the user's response, the host device 306 may enable the portable device 302 to maintain usage and failure data.

On subsequent connections between the host device 306 and the portable device 302, the portable device 302 may upload the collected information to the host device 306. Alternatively, the internal memory element 304 may be removed from the host device 302 and be read directly by the host device 306. In yet another alternative, the portable device 302 may to transfer it's statistics to another portable device. For example, the portable device 302 may be a digital still camera. The photos from the camera may be archived to another portable device (such as a portable hard disk). In this scenario, photos from the camera can be copied to the portable hard disk along with the collected statistics from the camera. The host device 306 may then receive this information from the hard disk. In this example, the digital still camera or its memory is never directly connected to the host device 306.

The host device 306 may perform a variety of operations with respect to the data received from the portable device 302. For example, a user may indicate a variety of preferences related to the collected data, and the host device 306 may perform filtering operations on the data based on these preferences. For instance, a user may indicate a preference to have all Personally Identifiable Data (PID) removed from the dataset. Accordingly, the host device 306 may filter all such PID information from the data received from the portable device 302. The host device 306 may also add information, such as an identification tag, to the data.

Once the host device 306 has completed its operations on the data, the host device 306 may communicate the data over the communication network 310 to a database 312. In one embodiment, the database 312 is a central clearinghouse for data related to portable devices. For example, the database 312 may receive information generated on many devices similar to the device 302. By compiling data from various devices, the database 312 may provide aggregate statistics describing the usage and failures of the devices. For example, an Information Technology (IT) management department of an enterprise may use the statistics to discover improper device usage. As will be appreciated by those skilled in the art, a variety of entities may utilize the device usage and failure data compiled within the database 312.

In one embodiment, the database 312 may disseminate the device information to a product provider 314 and/or to a service provider 316. For example, the portable device 302 may be a mobile telephone. Both the manufacturer of this phone and the telecommunication service provider may be interested in the performance and operation of this phone (and others like it). Accordingly, the compiled information, which includes information from the portable device 302 and other similar devices, may be communicated from the database 312 to the product provider 314 (i.e., the manufacturer) and to the service provider 316 (i.e., the telecommunication service provider). By correlating feature identifiers and usage statistics, the providers 314 and 316 may use the reported data for future device design or in connection with future service offerings.

In one embodiment, the product provider 314 or the service provider 316 may offer services in connection with the received information. For example, the providers 314 and 316 may develop content responsive to the information, and this content may be communicated to the host device 306 via the network 310. For instance, the providers 314 and 316 may supply useful device tips to the owner of the device 302 based on that user's operation of the device 302. Indeed, a variety of content may be communicated back to the host device 306. This content may relate to fixing errors on the device 302, measuring a consumer's satisfaction or offering promotional material. For example, the user may be offered special deals on software or hardware upgrades. The system 300 may also facilitate and enable "Device Wellness" programs in which firmware upgrades, usage tips and other updates may be distributed to users. In short, a variety of content may be produced by the providers 314 and 316 to enhance their relationships with customers.

Figure 4:
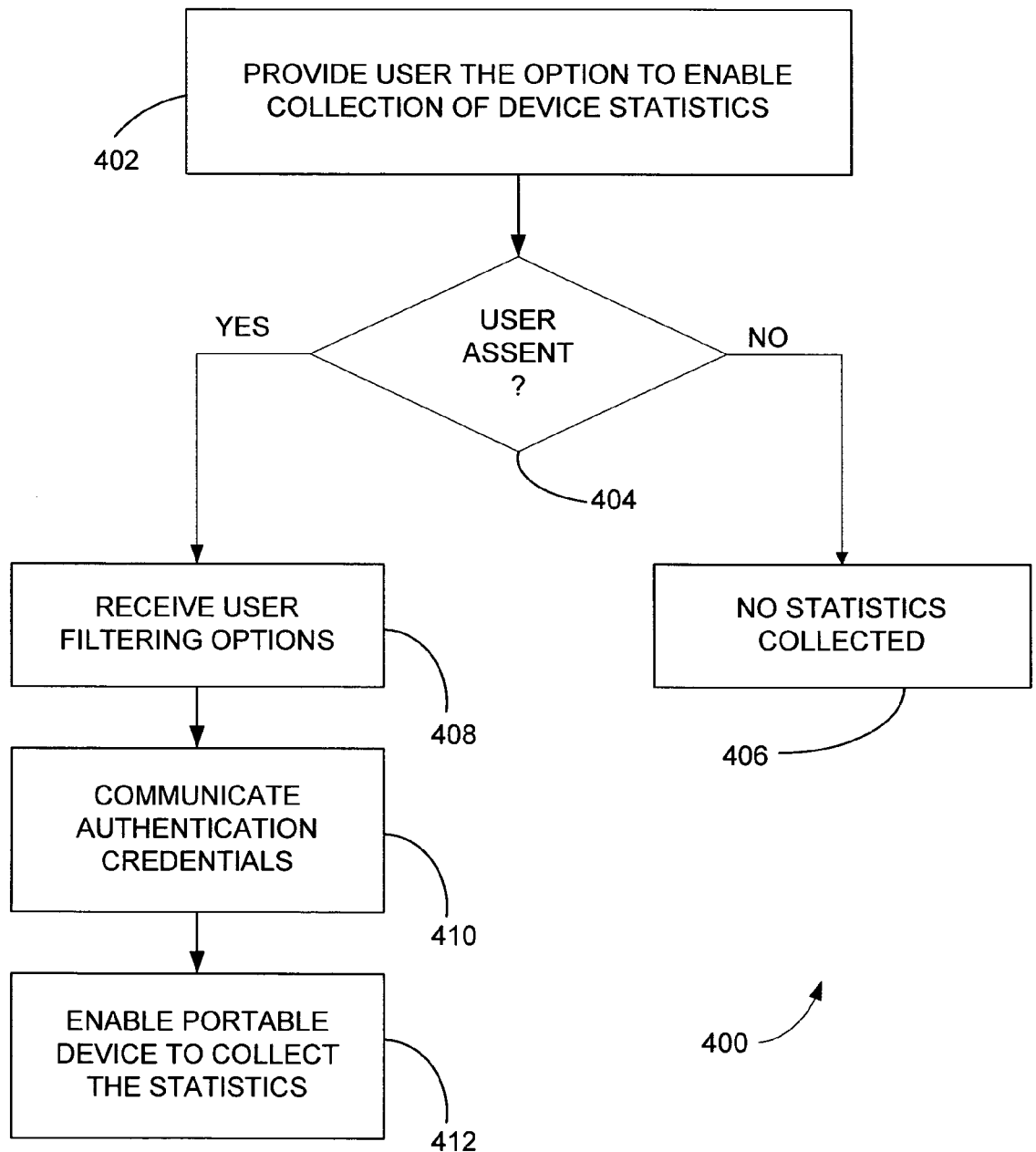
FIG. 4 illustrates a method in accordance with one embodiment of the present invention for initiating the collection of usage information from a portable device.

FIG. 4 illustrates a method 400 for initiating the collection of usage information on a portable device. The method 400, at 402, provides the user the option to enable the collection of device statistics on a portable device. In one embodiment, a host device may present a user interface allowing user selection of whether to opt-in to such monitoring of device operation data.

At 404, the method 400 receives an indication of the user's assent to the collection of device statistics. If the user declines such monitoring, the method 400, at 406, does not collect statistics. Alternately, if the user assents to the statistic gathering, the method 400 receives filtering selections from the user at 408. The filtering selections received at 408 may define a variety of user preferences related to the collected device operation statistics and the use of this information. The user may be provided a variety of options related to monitoring the usage and performance of the portable device. For example, the user may be given the option of whether or not device failure statistics should be maintained. The user may also authorize the collection of other usage statistics describing the use of the device. Further, the user may define privacy controls concerning how the collected information may be used and what information, if any, may be sent to a third party. Also, the collected information may be protected with a digital rights management routine/program. Such protection may enable an aggregation service to collect, aggregate, summarize and share the information in a manner that protects users' privacy or in a manner that enables business models that encourage users to share such information and vendors to take advantage of such information.

At 410, the method 400 communicates authentication credentials from a host device to the portable device. To avoid the possibility of unauthorized access to the collected data, the method 400 may permit a trusted host and the portable device to exchange authentication information. In this manner, on subsequent connections between the devices, the host can authenticate itself to the portable device in order to gain access to the stored device operation data.

The method 400, at 412, enables the portable device to collect statistics indicating device usage and failures. In one embodiment, the host device may communicate a set of metrics to the portable device defining which statistics should be collected. This set of metrics may reflect the user preferences received at 408. Once the statistics collection has been enabled, the portable device may be disconnected from the host device, and the portable device may be used in accordance with its intended purpose.

Figure 5:
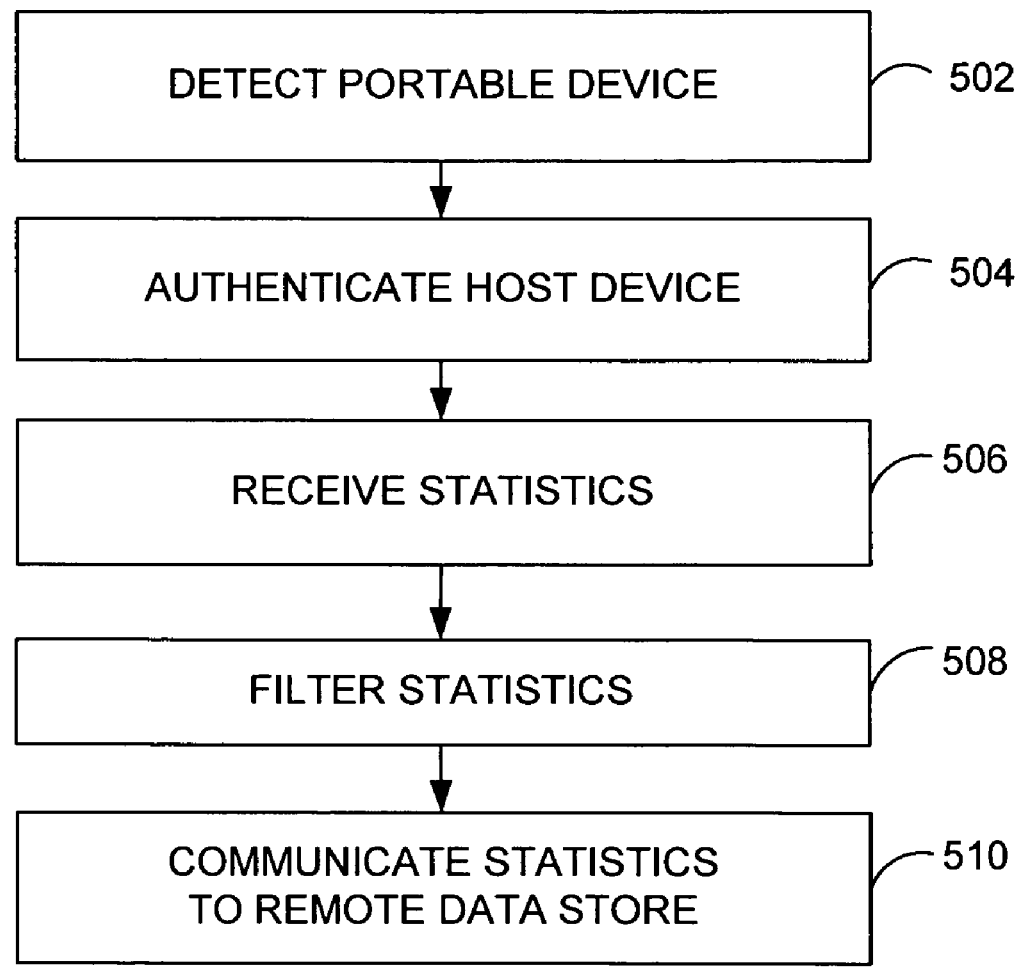
FIG. 5 illustrates a method in accordance with one embodiment of the present invention for collecting and communicating information about a portable device.

FIG. 5 illustrates a method 500 for collecting and communicating information about a portable device. The method 500, at 502, detects a portable device and initiates communication with the device. For example, the portable device may be connected to a host device, and a variety of information may be exchanged between the two devices. In one embodiment, the portable device may be configured to maintain device operation statistics describing the operation of the portable device. These statistics may be stored on a data memory element within the portable device.

The method 500, at 504, authenticates the host device. In order to access the stored statistics, the host device may be required to demonstrate it is authorized to receive the statistics. In one embodiment, the host device and the portable device may exchange authentication credentials when enabling collection of statistics. Upon subsequent connections between the devices, these credentials may be exchanged. In this manner, the method 500 may prevent unauthorized access to the device usage statistics.

If the authentication succeeds, the method 500, at 506, receives the device operation statistics from the portable device. In one embodiment, the user may define preferences related to the collected statistics. Utilizing these user-defined preferences, the method 500, at 508, filters the statistics. For example, the user may define which statistics may be collected and for what these statistics may be used. Also, the user may authorize the sending of certain statistics to a remote data store for consolidation with statistics from other devices. At 510, the filtered set of statistics is communicated by the method 500 over the network to a remote data store. The remote data store, for example, may receive statistics from a plurality of devices and may consolidate such statistics for further use and study.

Alternative embodiments and implementations of the present invention will become apparent to those skilled in the art to which it pertains upon review of the specification, including the drawing figures. Accordingly, the scope of the present invention is defined by the appended claims rather than the foregoing description.

The invention claimed is:

1. A computer-implemented method for collecting device usage information from a plurality of portable devices having an internal memory, said method comprising:

enabling at least a portion of said plurality of portable devices to maintain stored data containing one or more device operation parameters, including error data indicating occurrences of detected errors or failures, wherein said one or more device operation parameters are stored on said internal memory of at least a portion of said plurality of portable devices;

detecting a wired connection between at least one of said plurality of portable devices and a host computer, wherein said host computer is connected to a network;

incident to said detecting, receiving by said host computer at least a portion of said one or more device operation parameters from the internal memory of at least one of said plurality of portable devices;

communicating via said network at least a portion of said one or more device operation parameters, including at least a portion of said error data, to a database for consolidation; and utilizing the consolidation of said error data in said database to identify frequent errors or failures occurring on said plurality of portable;

wherein said enabling utilizes one or more privacy selections associated with a user to store said one or more device operation parameters in accordance with said one or more privacy selections.

2. The method of claim 1, further comprising consolidating in said database at least a portion of said one or more device operation parameters.

3. The method of claim 2, further comprising communicating at least a portion of the consolidated device operation parameters to an entity associated with at least a portion of said plurality of portable devices.

4. The method of claim 3, wherein said entity is a provider of at least a portion of said plurality of portable devices.

5. The method of claim 2, further comprising transmitting one or more items of content responsive to the consolidated device operation parameters.

6. The method of claim 5, further comprising installing at least a portion of said one or more items of content on at least a portion of said plurality of portable devices.

7. The method of claim 5, further comprising presenting at least a portion of said one or more items of content to a user.

8. A system for reporting device usage information for portable devices, said system comprising:
- a portable device having internal memory and configured to maintain a set of metrics describing the operation of said portable device, wherein said set of metrics includes error data indicating occurrences of detected errors or failures, wherein said set of metrics is stored on said internal memory, wherein said portable device lacks an interface to directly connect to a network;
- a host device in communication with said network and configured to connect with said portable device to receive at least a portion of said set of metrics from said internal memory,
- wherein said host device is further configured to select a portion of said set of metrics for transmission via said network; and
- a database that stores device operation information from a plurality of portable devices, including at least a portion of said error data, wherein said database is configured to receive the selected portion of said set of metrics and is further configured to consolidate said selected portion into said device operation information, wherein said database is further configured to utilizing the consolidation of said error data to identify frequent errors or failures occurring on said portable devices;
- wherein said host device is further configured to install one or more firmware updates received via said network onto said portable device,
- wherein at least a portion of said one or more firmware updates is created in response to at least a portion of said device operation information.

9. The system of claim 8, wherein said host device is further configured to store user preferences and to utilize said user preferences to select said portion of said set of metrics for transmission.

10. The system of claim 8, wherein at least a portion of said set of metrics is protected with a rights management routine.

* * * * *